(No Model.)
A. L. RADFORD.
TRAVELING CHAIN CONVEYING APPARATUS.
No. 522,854. Patented July 10, 1894.
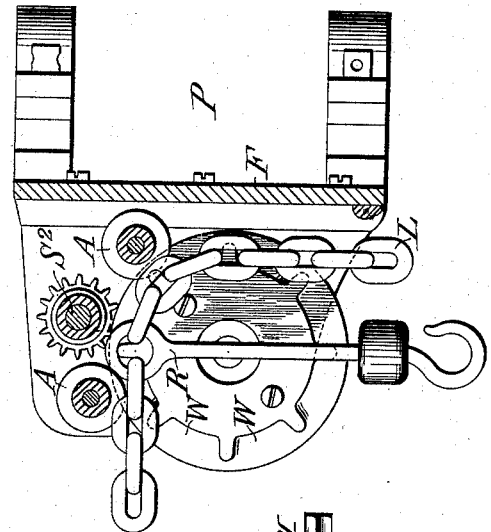
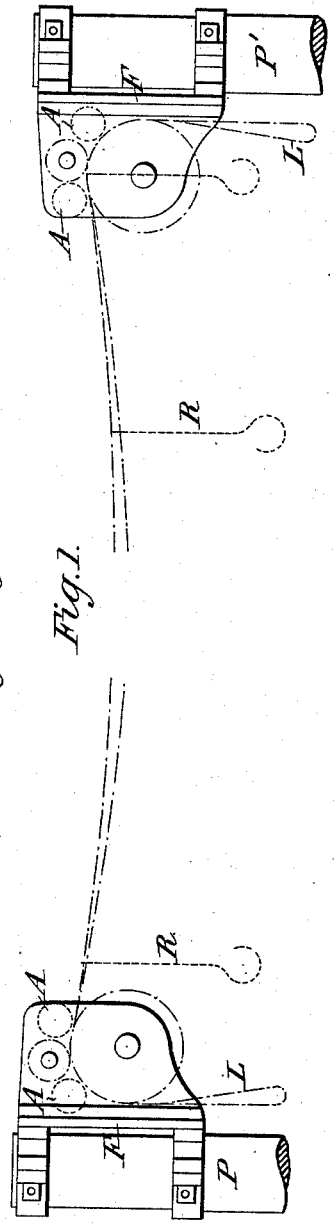
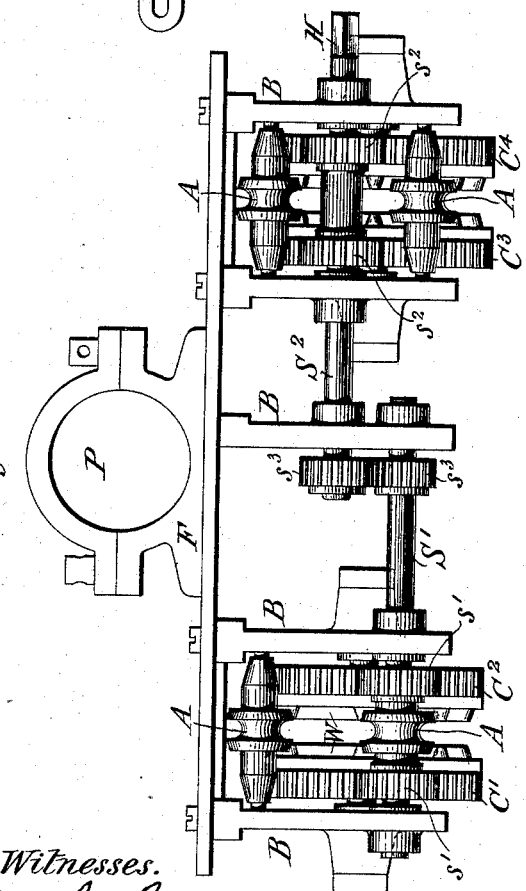
Witnesses.
Inventor.
Arthur Lock Radford
THE NORRIS PETERS CO., PHOTO-LITHO., WASHINGTON, D. C.

UNITED STATES PATENT OFFICE.

ARTHUR LOCK RADFORD, OF LONDON, ENGLAND.

TRAVELING-CHAIN CONVEYING APPARATUS.

SPECIFICATION forming part of Letters Patent No. 522,854, dated July 10, 1894.

Application filed December 19, 1893. Serial No. 494,118. (No model.) Patented in England October 25, 1890, No. 17,078; in Belgium March 7, 1891, No. 94,046; in France March 7, 1891, No. 211,958; in Germany March 8, 1891, No. 59,714, and in Italy March 28, 1891, LVII, 260.

*To all whom it may concern:*

Be it known that I, ARTHUR LOCK RADFORD, a subject of Her Majesty the Queen of Great Britain, residing at 58 Leadenhall Street, London, England, have invented certain new and useful Improvements in Traveling-Chain Conveying Apparatus, (for which I have obtained a patent in Great Britain, under date of October 25, 1890, No. 17,078; in Belgium, under date of March 7, 1891, No. 94,046; in France, under date of March 7, 1891, No. 211,958; in Germany, under date of March 8, 1891, No. 59,714, and in Italy, under date of March 28, 1891, Vol. LVII, No. 260,) of which the following is a specification.

It is often convenient to carry loads by means of chains traveling from one place to another over guide pulleys. My invention relates to the construction and arrangement of such chains and machinery for working them. I make the chain generally with links of the usual elongated form, but at whatever part of the chain I desire to attach a load I introduce a circular link forming the upper end of, and made in one piece with the suspension rod for carrying the load. The guide pulleys over which the chain travels are made in pairs mounted face to face sufficiently far apart to allow the suspension rods to pass between them, only those links of the chain which are in a horizontal attitude resting on the circumferences of the pulleys, the intermediate upright links finding their way between the pulleys. Some of the pulleys are arranged for driving the chain. In the peripheries of these I form hollows or indentations corresponging in form to the horizontal links, and over these pulleys I mount two or more guide rollers which nearly bear upon the horizontal links and prevent them from rising out of the indentations, thus insuring that the chain is driven. In some cases the chain is made to travel to and fro alternately. In other cases the chain is endless and travels continuously along one set of guide pulleys in the one direction, returning along another set. In order to drive both parts of such a chain in opposite directions I provide a framing at a terminus or place where the chain makes its return, and on this framing I mount two sets of the driving pulleys geared together to turn in opposite directions so as to give corresponding motions to the two parts of the chain. When the loads have to be carried from one station to another, as for instance across a river having no intermediate guide or supporting pulleys, I mount the pulleys at the two terminal stations at some height and allow bights of the chain to hang down from them, so that the loads can be attached to or detached from parts of the chain within easy reach. The chain in passing from the vertical pulleys by which it comes to a terminus, to the vertical pulleys by which it goes from the terminus, sometimes has to pass round a horizontal pulley. In the lower flange of this pulley under every vertical link I make a notch so as to allow suspending rods as they pass to enter those notches and so to remain hanging vertically. This horizontal pulley may be used for driving the chain, pressing rollers being, if necessary, applied at its periphery to keep the links engaged in the indentations of the pulley.

Figure 1 of the accompanying drawings is a diagram showing how loads may be carried from one post P to another P'; it may be for instance across a river. Fig. 2 is a vertical section on an enlarged scale, and Fig. 3 is a plan showing the two sets of pulleys and their gearing at each terminal post P, P'.

The chain which I employ is made with the ordinary elongated links L except where a load has to be hung from it, in which case the link is a circularly shaped eye of the rod R which carries the load, the circular form of this link giving the rod freedom to swing so that the load can always hang vertically from it or nearly so. On the post P or P' is fixed a strong framing F with five brackets B in which are bearings for the shafts of two pairs of chain pulleys $C'$ $C^2$ forming one pair facing each other with room between them for passage of the suspending rods R, and $C^3$ $C^4$ forming another pair similarly situated. The outer parts of the pulleys $C'$ $C^2$ are toothed and gear with a pair of pinions $s'$ $s'$ on one shaft $S'$, and the pulleys $C^3$ $C^4$ are similarly toothed gearing with a pair of pinions $s^2$ $s^2$ on the shaft $S^2$. The two shafts $S'$ $S^2$ carry pinions $s^3$ gearing with one another so that the shafts S' S² turn in opposite directions and consequently the pair of pulleys C' C² turn opposite to the other pair C³ C⁴. The inner faces of the pulleys are made with recesses W to receive the sides of the alternate chain links L which bridge across the space between the pulleys, and in order to prevent these links from rising out of the recesses W grooved rollers A are mounted in bearings in the brackets B, so that their peripheries nearly bear on the links of the chain and prevent them from rising out of the recesses of the pulleys C.

A winch handle may be applied at H to turn the shaft S², or other power may be applied to turn either of the shafts S' S², thereby causing the chain to travel from the one post P to the other P', over the one pair of pulleys, say C' C² at P' and down and up in a bight in front of the post, over the other pair of pulleys C³ C⁴ at P', then back to the one pair of pulleys C' C² on the post P, down and up in a bight to the other pair of pulleys C³ C⁴ on the post P and so on in its continued course, carrying a series of loads suspended from the chain by the rods R. The bights of the chain descending from the one pair of pulleys and ascending to the other pair in front of each post afford convenience for hooking loads on the rods R or unhooking them.

What I claim is—

1. In combination with a continuously traveling chain carrying loads, two sets of terminal apparatus, each consisting of two pairs of chain pulleys geared so that the one pair revolves opposite to the other, the two pulleys of each pair being mounted face to face with a gap between for passage of the rods carrying the loads, substantially as described.

2. In combination, a pair of chain pulleys, each portion composing the pair consisting of an outer toothed part and an inner face, having recesses, the two portions being arranged face to face, with a space between them, pinions gearing with the toothed parts for driving same, an endless chain having interposed suspending rods with eyes taking the places of links of the chain, said chain adapted to be driven by the pair of pulleys, grooved rollers nearly bearing on the links for the purpose of keeping the chain in place, and brackets for carrying the pulleys, pinions and rollers, substantially as described.

In testimony whereof I have hereunto set my hand in the presence of two subscribing witnesses.

ARTHUR LOCK RADFORD.

Witnesses:
T. F. BARNES,
WALTER J. SKERTEN,
*Both of* 17 *Gracechurch St., London.*